June 11, 1935.  F. S. COLVIN ET AL  2,004,269

FRUIT DRIER

Original Filed Sept. 3, 1929

INVENTOR.
Fred. S. Colvin.
John V. Rogers.
BY Philip A. Minnis
ATTORNEY.

Patented June 11, 1935

2,004,269

UNITED STATES PATENT OFFICE 2,004,269

FRUIT DRIER

Fred S. Colvin, Yakima, and John V. Rogers, Wenatchee, Wash., assignors to Food Machinery Corporation, San Jose, Calif., a corporation of Delaware Original application September 3, 1929, Serial No. 390,030. Divided and this application February 3, 1932, Serial No. 590,582

3 Claims. (Cl. 34—1)

This application is a division of our copending application, Serial No. 390,030, filed September 3, 1929, and the invention herein illustrated and claimed relates to a drying apparatus such as may suitably be used in the fruit packing industry for the drying of washed fruit.

In the process of preparing fresh fruit for shipment it is a customary practice to thoroughly wash the same previous to packing, in order to remove adhering dirt, spray residue and sticky deposits or exudations by passing the fruit through suitable apparatus adapted to accomplish this purpose. The fruit is thereupon passed through a drying apparatus, whereupon it is ready for immediate wrapping and packing.

A popular type of drier utilized for the purpose described comprises a conveyor for conveying the fruit to be dried, and an endless belt positioned above and longitudinally of the conveyor to which a series of depending wiping members are attached. The wiping members consist of strips of absorbent fabric securely sewed to the endless carrier belt and depending therefrom so as to contact with the wet fruit passing over the conveyor and remove the moisture therefrom. The carrier belt and its associated wipers is continually passed between a pair of wringer rollers which wring the moisture from the wiper members, so that their drying efficiency is not destroyed by saturation.

In the operation of the type of drier just described considerable difficulty has been experienced in maintaining the carrier belt in proper position, for the reason that differences in pressure at different points of contact between the wringer rollers, or inequalities of stretching or shrinking of the carrier belt itself, resulted in the belt being crowded to one side or the other or even being run off its supports. When this occurs the machine must be shut down until the proper readjustments can be made.

Among other disadvantages of the carrier belt construction just described might be mentioned the necessity of frequent adjustment to prevent the belt from sagging, and the difficulty of replacing worn wipers. The wipers are commonly sewed to the carrier belt and this cannot be accomplished satisfactorily by hand, so that it is necessary to remove the entire carrier belt from the machine in order to sew on new wipers by means of a special machine for that purpose.

It is a principal object of our invention to provide a drying apparatus with an improved wiper carrying means which will run true, will not sag, and will permit the ready and rapid removal and replacement of wipers without the necessity of removing the carrier belt from the machine.

It is also an object to provide a wringer structure for expressing moisture from the wipers which is especially adapted for operation with our novel carrier means.

Further objects and advantages will be apparent as the description proceeds in connection with the accompanying drawing, in which.

Figure 1:
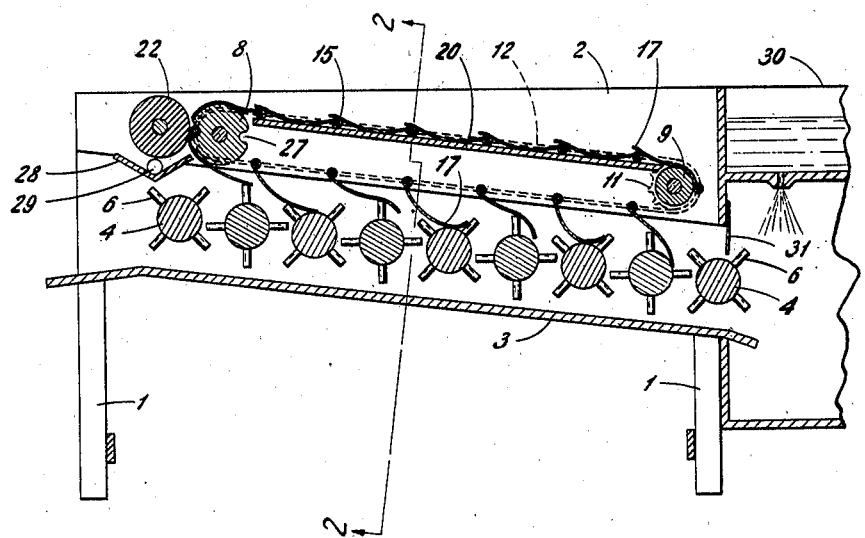
Figure 1 is a longitudinal section of a preferred form of drying apparatus embodying the principles of our invention.
Figure 2:
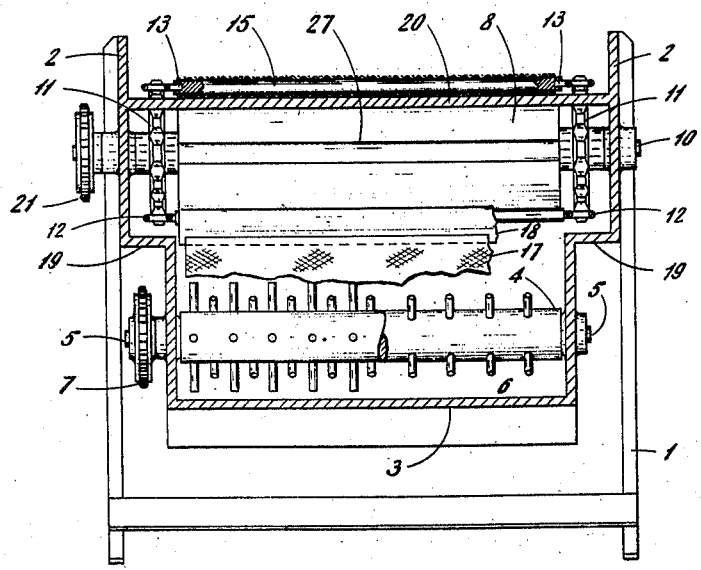
Figure 2 is a cross section taken along the line 2—2 of Figure 1.

The apparatus is illustrated in the drawing as being integral with a fruit washer, so as to receive the fruit directly therefrom, but it will be understood that this is a matter of convenience only and the drier may be a separate unit if desired. We have shown only a small portion of the washer, since its construction is fully disclosed in our copending application above referred to and forms no part of the present invention.

The drier as a whole is supported by suitable uprights 1, and includes an open ended box like structure formed by the side walls 2 and rearwardly sloping bottom 3. In the lower portion of the apparatus is disposed a conveyor for conveying the fruit to be dried. This conveyor comprises a plurality of transverse supporting rollers 4 arranged in parallel relation and provided with stub shafts 5 journaled in the side walls. Each of the rollers is provided with rows of spaced flexible fingers 6 for advancing the fruit, the fingers on adjacent rollers being staggered as shown, so that they pass between each other as the rollers rotate. A sprocket 7 is secured to each of the stub shafts 5 projecting from one side of the apparatus so that the rollers may be operated in a common direction, as by means of an endless chain or the like.

In the upper portion of the drier above the conveyor are located the revoluble drums 8 and 9, around which the wipers pass during operation. The drums 8 and 9 are carried by shafts 10 journaled in the side walls 2 and to these shafts adjacent the ends of the drums are secured the sprockets 11 around which pass a pair of endless chains 12, which are supported thereby. Each chain is provided with a series of inwardly projecting pins 13 secured to the chain at regularly spaced intervals and adapted to support the ends of a series of rods 15 extending transversely between the chains.

The rods 15 serve as supports for a plurality of depending absorbent wipers 17 which are wide enough to extend substantially the entire width of the conveyor over which they hang, and are long enough so that during a portion of their travel they may contact with fruit passing over the conveyor. The wipers are preferably attached to the rods by means of loosely fitting sleeves 18 made of heavy fabric such as canvas or the like, to the lower edges of which the wipers are sewed.

In order to prevent sagging of the lower run of the wiper carrying means adjacent the conveyor, the side walls 2 are offset as indicated at 19 so as to form ledges directly beneath the chains 12. A table 20 is disposed beneath the upper run of the wiper carrying means and serves to support the wipers in the upper run and prevent them from becoming entangled with the rods passing therebeneath.

The wiper carrying mechanism is driven in the direction indicated by the arrows in Figure 1 by means of a sprocket 21 secured to one of the shafts 10, and preferably are driven at a greater speed than the conveyor rollers 4 are rotated, so that the wipers are dragged over the fruit advancing over the conveyor.

Saturation of the wipers by moisture absorbed from the fruit is prevented by means of a wringer roller 22 arranged adjacent the drum 8 and coacting therewith to form a wringer through which the wipers are continually passed to express the moisture therefrom.

In order that the wringer roller 22 and associated drum 8 may be maintained in co-acting relationship without interference by the rods 15, the drum 8 is provided with longitudinal corrugations 27, so spaced and so arranged with relation to the teeth of the sprockets 11 adjacent the ends of the drum that each rod is received in one of them as it passes around the drum. This construction is especially adapted for use with our improved wiper carrier, and permits the wringer roller and drum to be maintained in constant contact, so that no portions of any of the wipers escape the wringing action.

A trough 28 is arranged beneath the wringer members to receive liquid expressed from the wipers and direct it from the machine through a spout 29.

In operation the fruit may be delivered to the drier directly from the washer 30 on the conveyor rollers which, if desired, may be simply an extension of the conveyor utilized to convey the fruit through the washer. A flexible apron 31 at the entrance to the drier prevents liquid in the washer from being splashed into the drier. As the conveyor rollers are rotated in the direction indicated, the fingers 6 advance the fruit toward the discharge end of the drier, and as the fruit is advanced the absorbent driers 17 are dragged over the pieces of fruit at a rate somewhat faster than the rate of advance of the fruit and remove the moisture therefrom.

The wet wipers are passed between the drum 8 and wringer roller 22, whereby the liquid is expressed therefrom and their drying efficiency is restored. As will be seen, the construction of the wiper carrying means, including the chains 12, passing over the sprockets 11, and the interconnecting rods 15 insures that it will run true at all times, and provides a support for the wipers of such character that they may readily be replaced when desired without the necessity of removing the carrier from the machine. To remove a wiper it is only necessary to spread the chains apart a sufficient distance to disengage one of the pins 13 from the rod, whereupon that end of the rod may be dropped down and the sleeve and its associated wiper slipped therefrom. The wiper may then be removed from the sleeve and a new one sewed on, whereupon it may be replaced on the carrier rod.

Although the invention has been described in connection with the drying of fruit, it will be understood that it may be used for the drying of other articles as well, and the term "fruit" as used herein is intended to be inclusive of such other articles.

Having now described our invention and in what manner the same may be used, what we claim as new and desire to protect by Letters Patent is as follows:

1. In a fruit drier, a conveyor, an endless carrier means arranged above and longitudinally of the conveyor, a rod secured transversely of said carrier means, a dependent wiping member secured to said rod and adapted to contact with pieces of fruit on the conveyor, and a pair of wringer rollers between which the wiping member passes, one of said wringer rollers being provided with a corrugation for the reception of said rod.

2. In a fruit drier, a conveyor, a pair of endless carrier members arranged above and longitudinally of the conveyor, a rod secured to said carrier members and extending transversely therebetween, a dependent wiping member secured to said rod and adapted to contact with pieces of fruit on the conveyor, and a pair of wringer rollers between which the wiping member passes, one of said wringer rollers being provided with a corrugation for the reception of said rod.

3. In a fruit drier, a conveyor, a pair of endless carrier members arranged above and longitudinally of the conveyor, a rod secured to said carrier members and extending transversely therebetween, a depending wiping member secured to said rod and adapted to contact with pieces of fruit on the conveyor, and a pair of wringer rollers between which the wiping member passes, one of said wringer rollers having a portion of its surface cut away to provide for the passage of the rod between the rollers.

FRED S. COLVIN.
JOHN V. ROGERS.